(12) United States Patent
    Han

(10) Patent No.: US 12,177,331 B2
(45) Date of Patent: Dec. 24, 2024

(54) METHOD AND APPARATUS FOR DATA PROCESSING IN EQUITY INCENTIVE SYSTEM

(71) Applicant: FUTU NETWORK TECHNOLOGY (SHENZHEN) CO., LTD., Guangdong (CN)

(72) Inventor: Zhiwei Han, Guangdong (CN)

(73) Assignee: FUTU NETWORK TECHNOLOGY (SHENZHEN) CO., LTD., Guangdong (CN)

( * ) Notice: Subject to any disclaimer, the term of this patent is extended or adjusted under 35 U.S.C. 154(b) by 230 days.

(21) Appl. No.: 17/946,053

(22) Filed: Sep. 16, 2022

(65) Prior Publication Data

US 2023/0141633 A1    May 11, 2023

Related U.S. Application Data

(63) Continuation of application No. PCT/CN2021/129059, filed on Nov. 5, 2021.

(51) Int. Cl.
    *H04L 9/06*      (2006.01)
    *G06F 21/60*     (2013.01)
    (Continued)

(52) U.S. Cl.
    CPC ........... *H04L 9/0618* (2013.01); *G06Q 40/04* (2013.01); *H04L 9/14* (2013.01); *H04L 9/30* (2013.01); *H04L 2209/56* (2013.01)

(58) Field of Classification Search
    CPC . H04L 9/0618; H04L 9/14; H04L 9/30; H04L 9/0825; H04L 2209/56;
    (Continued)

(56) References Cited

U.S. PATENT DOCUMENTS 7,039,192 B1    5/2006  Whelan
8,983,061 B2 *  3/2015  Watanabe ............. H04L 63/164
                                                    713/168
(Continued)

FOREIGN PATENT DOCUMENTS

CN    105101190 A    11/2015
CN    106301759 A     1/2017
(Continued)

OTHER PUBLICATIONS

A privacy-preserved full-text retrieval algorithm over encrypted data for cloud storage applications by Song et al.; published 2016. (Year: 2016).*

(Continued)

*Primary Examiner* — Vu V Tran

(57) ABSTRACT

Provided are a method and an apparatus for data processing in an equity incentive system, which are applied in an equity incentive system, such as an Employee Stock Ownership Plan (ESOP) system. A first device obtains a mapping relation that includes a correspondence between at least one data type and at least one encryption scheme, determines a first encryption scheme corresponding to a data type of first data based on the mapping relation, generates a first data packet based on the first encryption scheme, and transmits the first data packet to a second device. In this way, the first device uses different encryption schemes based on different data types, and the second device obtains the first data by decryption based on an encryption identifier That is, according to the present disclosure, different encryption schemes are used for different data types, thereby improving data security without affecting normal use.

14 Claims, 6 Drawing Sheets

(51) Int. Cl.
 *G06F 21/62* (2013.01)
 *G06Q 40/04* (2012.01)
 *H04L 9/08* (2006.01)
 *H04L 9/14* (2006.01)
 *H04L 9/30* (2006.01)
 *H04L 9/40* (2022.01)

(58) Field of Classification Search
 CPC ............. H04L 63/0442; H04L 63/0478; H04L 63/061; G06Q 40/04; G06F 21/602; G06F 21/6218
 See application file for complete search history.

(56) References Cited

U.S. PATENT DOCUMENTS

| | | | |
|---|---|---|---|
| 2006/0178949 A1* | 8/2006 | McGrath | G06Q 30/0601 705/26.1 |
| 2015/0358159 A1* | 12/2015 | Rozenberg | H04L 9/0618 380/28 |
| 2016/0254911 A1* | 9/2016 | Manchepalli | H04L 9/14 713/193 |
| 2016/0357980 A1 | 12/2016 | Balasubramanian et al. | |
| 2017/0344646 A1* | 11/2017 | Antonopoulos | H04L 63/205 |
| 2019/0132120 A1 | 5/2019 | Zhang et al. | |
| 2020/0004788 A1* | 1/2020 | Qiu | G06F 16/9014 |
| 2020/0175780 A1* | 6/2020 | Deshmukh | G07C 5/0808 |

FOREIGN PATENT DOCUMENTS

| | | |
|---|---|---|
| CN | 106385414 A | 2/2017 |
| CN | 108197485 A | 6/2018 |
| CN | 108880812 A | 11/2018 |
| CN | 109344656 A | 2/2019 |
| CN | 109495252 A | 3/2019 |
| CN | 110188558 A | 8/2019 |
| CN | 110474932 A | 11/2019 |
| CN | 110599348 A | 12/2019 |
| CN | 110602690 A | 12/2019 |
| CN | 111967023 A | 11/2020 |
| CN | 112235289 A | 1/2021 |
| CN | 112235299 A | 1/2021 |
| CN | 112469003 A | 3/2021 |
| CN | 112528338 A | 3/2021 |
| CN | 112598382 A | 4/2021 |
| EP | 3891924 A1 | 10/2021 |
| WO | 2019127265 A1 | 7/2019 |
| WO | 2021196915 A1 | 10/2021 |

OTHER PUBLICATIONS

International Search Report and Written Opinion dated Jul. 27, 2022 in International Application No. PCT/CN2021/129059.
Grant Notice dated Dec. 9, 2023 received in Chinese Application No. 202180010806.7. English translation attached.
Lian Shiguo et al., "Video Encryption and Its Development", Information and Control, Issue 05, Full text, Oct. 20, 2004.
Wei Yueqiong et al., "An Algorithm of Hidden Information Based on Grouping", Journal of Guangxi Academy of Sciences, Issue 04, Full text, Nov. 15, 2007.
Second Office Action dated Jan. 8, 2024 received in corresponding patent family application No. AU2021427872.
First Office Action from corresponding Chinese Application No. 202180010806.7, dated May 27, 2023. English translation attached.
First Office Action dated Aug. 18, 2023 received in corresponding patent family application No. AU2021427872.

\* cited by examiner

METHOD AND APPARATUS FOR DATA PROCESSING IN EQUITY INCENTIVE SYSTEM

CROSS-REFERENCE TO RELATED APPLICATION

The present application is a continuation of International Patent Application No. PCT/CN2021/129059, filed on Nov. 5, 2021, the entire content of which is incorporated herein by reference.

FIELD

Embodiments of the present disclosure relate to the field of software technologies, and more particularly, to a method and an apparatus for data processing in an equity incentive system.

BACKGROUND

As a form of realization of employee ownership, the Employee Stock Ownership Plan (ESOP, also known as the employee stock ownership system) is an institutional arrangement for an owner and employees to share the ownership of a company and the right to future earnings of the company. Since the long-term incentive system stores information about long-term incentives granted by the company to the employees, which is of a high confidential level, unrelated personnel, including development, operation, and maintenance personnel, are not allowed to query the information.

In a conventional scheme, data is encrypted by a symmetric encryption scheme. However, when data leakage occurs, usually both a secret key and a cipher text may be leaked, or the secret key may be intercepted during transmission.

Therefore, it is urgent to find a data processing method for processing sensitive information that can ensure data security of the sensitive information.

SUMMARY

The embodiments of the present disclosure provide a method and an apparatus for data processing in an equity incentive system, capable of improving data security.

In a first aspect, a method for data processing in an equity incentive system is provided. The method includes: obtaining a mapping relation that includes a correspondence between at least one data type and at least one encryption scheme; determining, based on the mapping relation, a first encryption scheme corresponding to a first data type of first data; encrypting the first data in accordance with the first encryption scheme to obtain a first cipher text; generating a first data packet based on the first cipher text and the first encryption scheme; and transmitting the first data packet to a second device in the equity incentive system.

A first device obtains the mapping relation that includes the correspondence between the at least one data type and the at least one encryption scheme, determines the first encryption scheme corresponding to a data type of the first data based on the mapping relation, generates the first data packet based on the first encryption scheme, and transmits the first data packet to the second device. In this way, the first device uses different encryption schemes based on different data types, and the second device obtains the first data by decrypting based on an encryption identifier. That is, according to the embodiments of the present disclosure, different encryption schemes are used for different data types, thereby improving data security without affecting normal use.

In a possible implementation, the first encryption scheme is a random padding encryption scheme, a non-random encryption scheme, or a long text encryption scheme.

In a possible implementation, the first encryption scheme is the long text encryption scheme; said encrypting the first data in accordance with the first encryption scheme to obtain the first cipher text includes: encrypting the first data using a first secret key to obtain the first cipher text, where the first secret key is a secret key corresponding to the first data; and encrypting the first secret key to obtain a second cipher text; and said generating the first data packet based on the first cipher text and the first encryption scheme includes generating the first data packet based on the first cipher text, the first encryption scheme, and the second cipher text.

In a possible implementation, the first encryption scheme is the random padding encryption scheme; said encrypting the first data in accordance with the first encryption scheme to obtain the first cipher text includes encrypting the first data using a first secret key to obtain the first cipher text, where the first secret key is a random secret key; and said generating the first data packet based on the first cipher text and the first encryption scheme includes generating the first data packet based on the first cipher text and the first encryption scheme.

In a possible implementation, the first encryption scheme is the non-random padding encryption scheme; said encrypting the first data in accordance with the first encryption scheme to obtain the first cipher text includes encrypting the first data using a first secret key to obtain the first cipher text, wherein the first secret key is a fixed secret key; and said generating the first data packet based on the first cipher text and the first encryption scheme includes generating the first data packet based on the first cipher text and the first encryption scheme.

In a possible implementation, said encrypting the first secret key to obtain the second cipher text includes encrypting the first secret key using a second secret key to obtain the second cipher text, where the second secret key is a secret key agreed between the first device and the second device.

In a possible implementation, said encrypting the first secret key to obtain the second cipher text includes encrypting the first secret key using a second secret key to obtain the second cipher text, where the second secret key is a public key corresponding to a private key in the second device.

In a possible implementation, the method further includes, prior to transmitting, by the first device, the first data packet to the second device, splicing, by the first device, the first cipher text and the second cipher text to obtain the first data packet.

In a possible implementation, said generating the first data packet based on the first cipher text and the first encryption scheme includes generating the first data packet by using an encryption identifier corresponding to the first encryption scheme as a prefix.

In a second aspect, a method for data processing in an equity incentive system is provided and is applied in a second device in the equity incentive system. The method includes: receiving a first data packet transmitted by a first device in the equity incentive system, where the first data packet includes a first cipher text and a prefix; decrypting, in accordance with an encryption scheme corresponding to the prefix, the first cipher text to obtain first data, where the encryption scheme is a random padding encryption scheme, a non-random encryption scheme, or a long text encryption scheme; and performing data processing on the first data.

The second device receives the first data packet from the first device, determines the encryption scheme based on the prefix of the first data packet, and performs decryption using a corresponding decryption method. That is, according to the embodiments of the present disclosure, different encryption schemes are used for different data types, thereby improving data security without affecting normal use.

In a third aspect, a terminal device is provided. The terminal device includes a processor and a memory. The memory has a computer program stored thereon, and the processor is configured to call and execute the computer program stored in the memory to perform the method in the first aspect or the second aspect.

In a fourth aspect, a computer-readable storage medium is provided, and the computer-readable storage medium has a computer program stored thereon. The computer program, when executed by a computer, causes the computer to perform the method in the first aspect or the second aspect.

In a fifth aspect, a computer program product is provided. The computer program product includes computer program instructions, and the computer program instructions, when executed by a computer, cause the computer to perform the method in the first aspect or the second aspect.

In a sixth aspect, a computer program is provided. The computer program, when running on a computer, causes the computer to perform the method in the first aspect or the second aspect.

In a seventh aspect, a communication system is provided. The communication system includes an apparatus for performing any procedure in the above first aspect and an apparatus for performing any procedure in the above second aspect.

According to the above technical solutions, the first device obtains the first cipher text by encrypting the first data using the first secret key, encrypts the first secret key to obtain the second cipher text, and transmits the first data packet including the first cipher text and the second cipher text to the second device, such that only after the second device decrypts the second cipher text to obtain the first secret key can the second device obtain the first data by decrypting the first cipher text based on the first secret key. In this way, it is ensured that the first data cannot be found by the development, operation, and maintenance personnel when they access a database, thereby improving data security.

DESCRIPTION OF EMBODIMENTS

Technical solutions according to embodiments of the present disclosure will be described below in conjunction with accompanying drawings of the embodiments of the present disclosure. Obviously, the embodiments described below are only a part of the embodiments of the present disclosure, rather than all of the embodiments. All other embodiments obtained by those skilled in the art based on the embodiments in the present disclosure without creative labor shall fall within the protection scope of the present disclosure.

Figure 1:
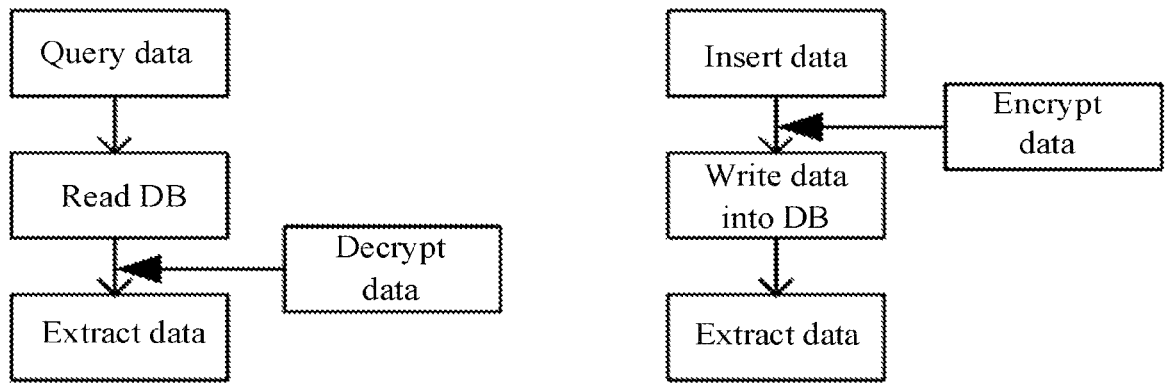
FIG. 1 is a schematic diagram showing an encryption process applied in an embodiment of the present disclosure.

FIG. 1 illustrates a schematic diagram of an encryption process. Encryption of data occurs before the data is inserted into a data base (DB), and a cipher text is stored in the data base after the encryption; and decryption of the data occurs after the DB is read, and the data is decrypted after being extracted from the DB.

It should be understood that in the embodiments described below, "first", "second", and various numerical numbers are only distinctions made for convenience of description, rather than limitations on the scope of the embodiments of the present disclosure.

Figure 2:
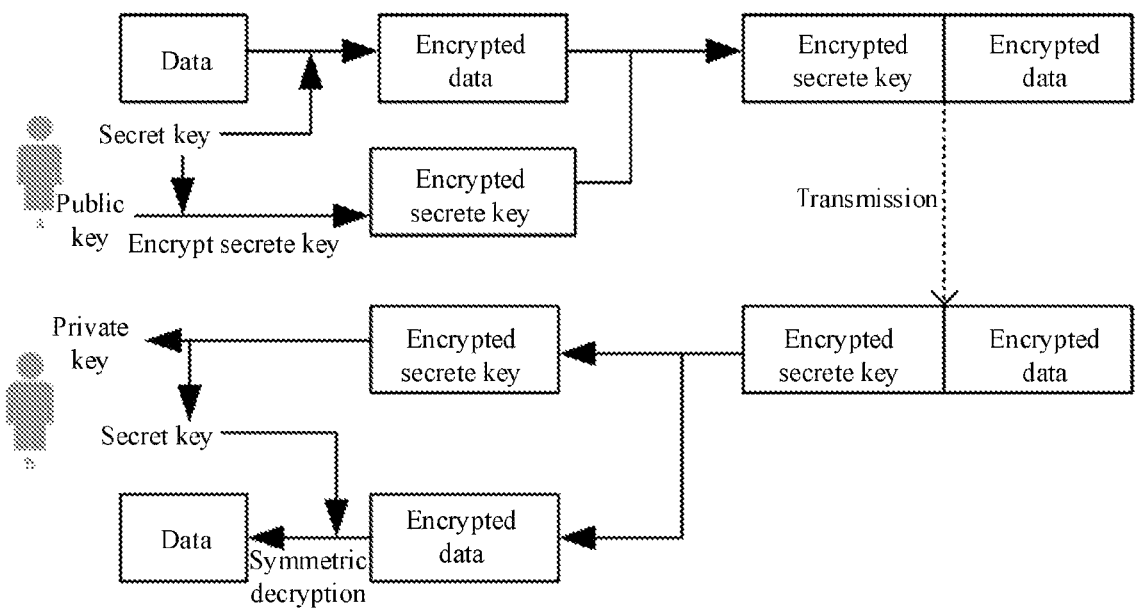
FIG. 2 is a schematic diagram showing encryption of a communication between a service layer and an encryption and decryption service according to an embodiment of the present disclosure.

FIG. 2 illustrates a schematic diagram showing encryption of communication between a service layer and an encryption and decryption service. The service layer and the encryption and decryption service distribute a symmetric key by distributing a result of asymmetric encryption of the symmetric key, thereby verifying information integrity. A data packet contains a content that is encrypted and a secret key that is encrypted and used for encrypting the content. A public key of a receiving side is used to encrypt the secret key for encryption, which is not a must, and a symmetric key pre-shared by a send side and the receiving side may alternatively be used for encryption. When a data packet is received by the receiving side, the receiving side first decrypts the data packet using a private key or the pre-shared key to obtain the secret key for encryption, and then uses the secret key to decrypt a cipher text to obtain an original text. In this embodiment, a data secret key for encrypting data is enclosed in the data packet for storage, transmission, and use, and a master secret key is no longer used to encrypt or decrypt data directly. Each piece of data has a secret key for data encryption, which is called data_key. Each data_key is encrypted by a secret key subjected to secret key management, and stored along with the data in the DB, a cache, or a file.

Figure 3:
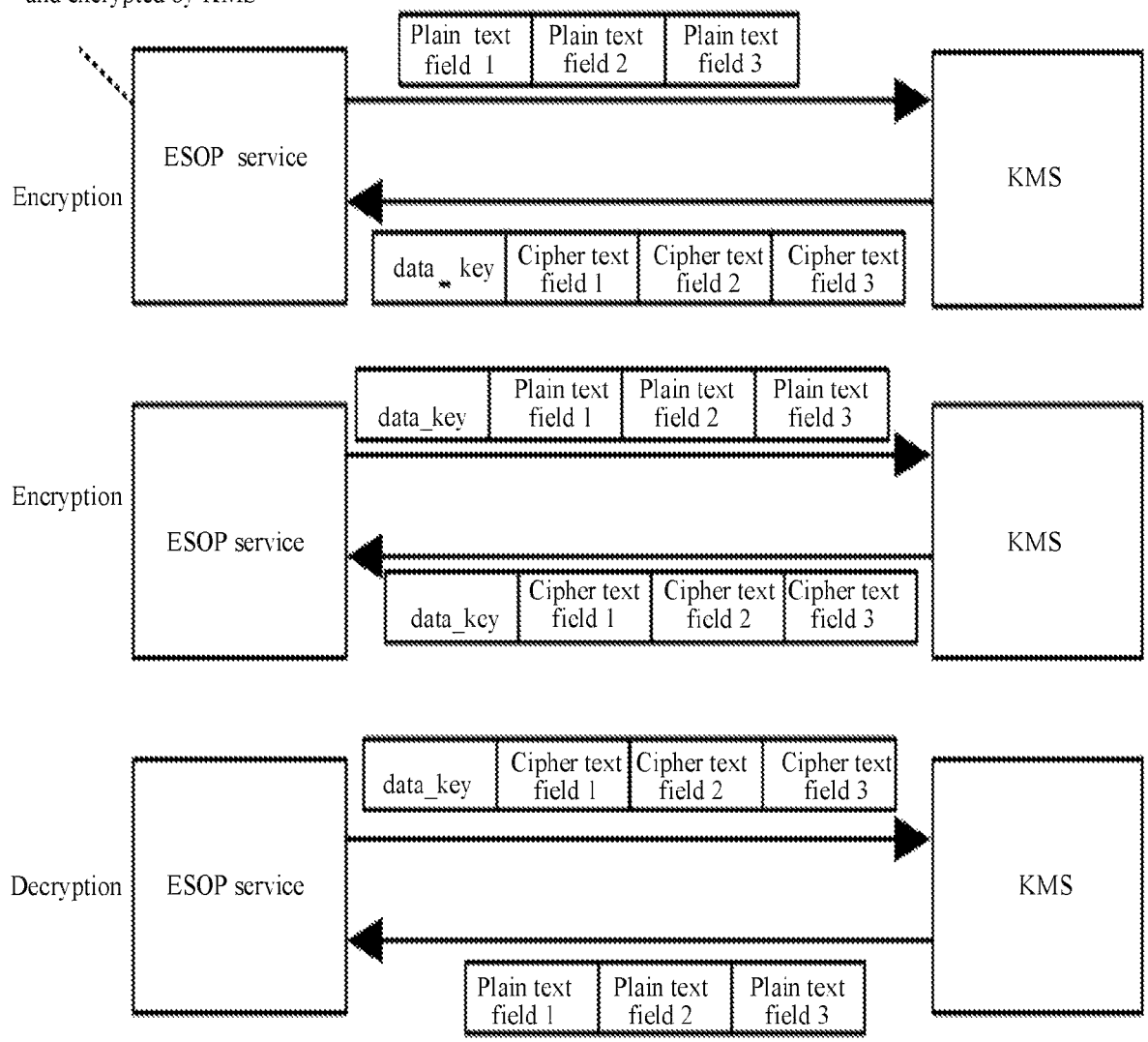
FIG. 3 is a schematic diagram showing data packet-based encryption according to an embodiment of the present disclosure.

For example, FIG. 3 illustrates a schematic diagram of data packet-based encryption.

Specifically, an encryption process may be that an ESOP end transmits a plain text field to a KMS end, and the KMS end generates a secret key, encrypts the plain text field using the secret key to obtain a cipher text field, encrypts the secret key to obtain an encrypted secrete key, and finally, transmits the encrypted secrete key and the cipher text field together to an ESOP server; or, the encryption process can be that the ESOP end transmits a secret key configured to encrypt the plain text field to the KMS end, and the KMS end encrypts the plain text field using the secret key to obtain the cipher text field, encrypts the secret key to obtain the encrypted secrete key, and finally, transmits the encrypted secrete key and the cipher text field together to the ESOP server.

Specifically, a decryption process may be that the ESOP server transmits the encrypted secrete key and the cipher text field to the KMS end, and the KMS end decrypts the encrypted secrete key to obtain the decrypted secret key, decrypts the cipher text field using the decrypted secret key to obtain the plain text field, and finally, transmits the plain text field to the ESOP.

Figure 4:
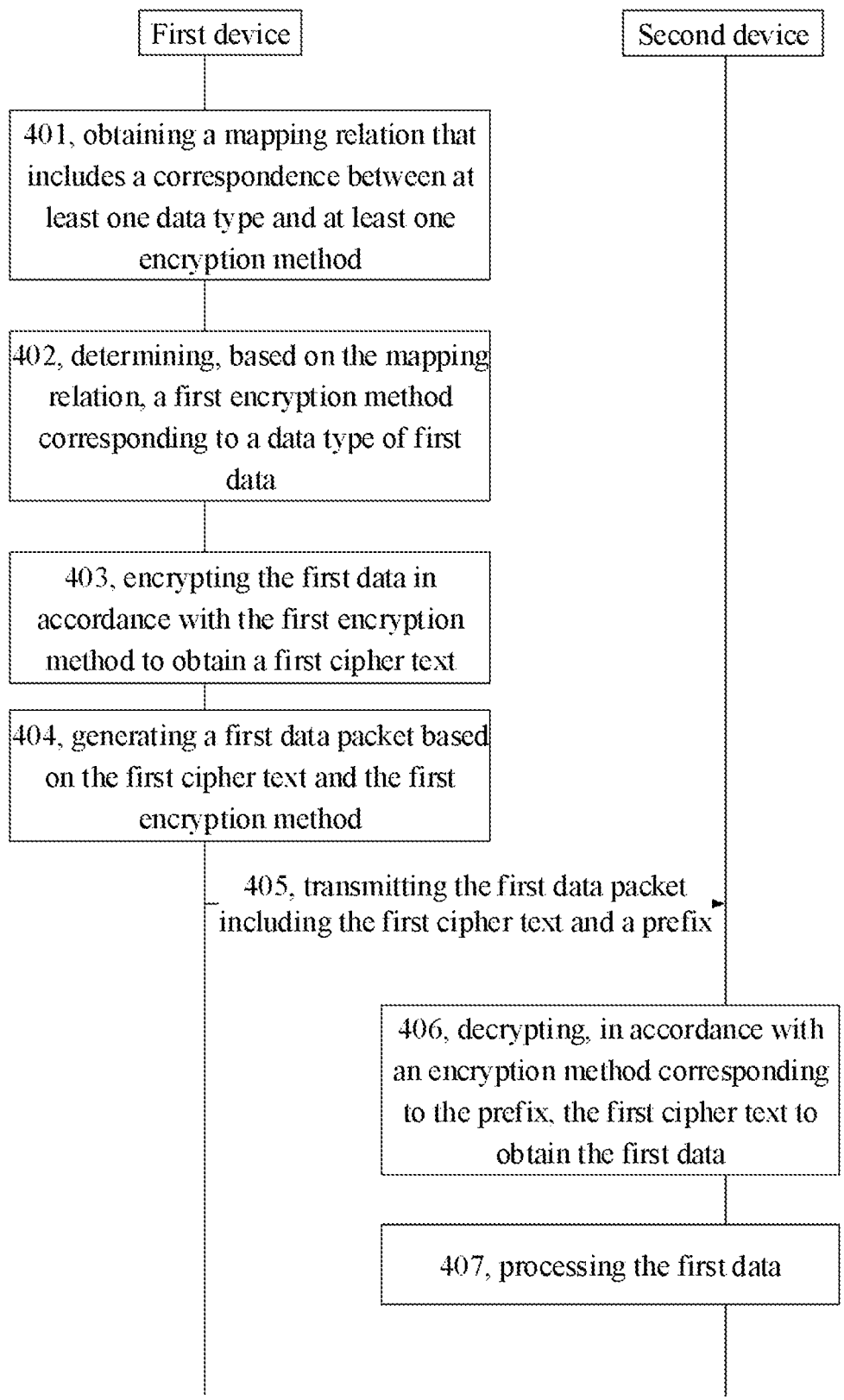
FIG. 4 illustrates a flowchart of a method for data processing according to an embodiment of the present disclosure.

FIG. 4 illustrates a flowchart of a method for data processing in an equity incentive system according to an embodiment of the present disclosure.

It can be understood that an execution subject in this embodiment of the present disclosure may be a first device, and the first device may be a first device in the equity incentive system, which may be a service side (ESOP_service), i.e., a server device at an ESOP service side.

At step 401, a mapping relation that includes a correspondence between at least one data type and at least one encryption scheme is obtained.

The mapping relation between the at least one data type and the at least one encryption scheme in this embodiment is illustrated in Table 1. encryption schemes in this embodiment include, but are not limited to, random padding encryption, non-random padding encryption, long text encryption, and non-encryption, which are specifically ranked from a high security performance to a low security performance as: random padding encryption>non-random padding encryption>long text encryption>non-encryption. Here, the random padding encryption has disadvantages of inability to support a cipher text query and long encryption time consumed for a long text greater than 4 k. Therefore, the non-random padding encryption and the long text encryption are more commonly used.

TABLE 1

| Encryption scheme | Prefix | Description | Applicable data type |
|---|---|---|---|
| Random padding encryption | FUTU$001 | Each time a plain text A corresponds to a random cipher text B | Fields not involved in a query |
| Non-random padding encryption | FUTU$002 | Each time a plain text A corresponds to a fixed cipher text B | Fields related to an index/query |
| Long text encryption | FUTU$TyThg4 KnMMKH5G1n$ | A local AES encryption operation is performed by encrypting a secrete key | A text or a file having a length greater than a predetermined threshold |
| Non-encryption | Null | Plain texts | Non-sensitive data |

As illustrated in Table 1, in the data types in this embodiment, the fields not involved in the query include: remark information, communication addresses, and other information that a management person will not retrieve; the fields related to the query include user names, identity card numbers, phone numbers, etc., by means of which information the management person needs to find data; the text or the file having the length greater than the predetermined threshold includes various EXCEL files such as data reports, and PDF electronic contract files; and the non-sensitive data includes various configuration items, etc.

In an embodiment of the present disclosure, the prefix is used to identify an encryption scheme of the cipher text. That is, after data is encrypted, a label needs to be attached to the encrypted data to indicate the encryption scheme of the data, so that a decryption method can be determined when decryption is to be performed. For example, if a plain text ABC is encrypted using the padding encryption scheme, then two pieces of information need to be transmitted to an encryption machine, i.e., the encryption type: padding encryption, and the plain text: ABC. After the encryption, the encryption machine returns a cipher text XXYYZZ. In this case, the cipher text XXYYZZ needs to be stored in a database. Since an identifier cipher text corresponding to the padding encryption is FUTU$001, the cipher text XXYYZZ may be stored as FUTU$001XXYYZZ in the database. If non-padding encryption is used, then the cipher text returned by the encryption machine is SSDDFF. In this case, the cipher text SSDDFF may be stored as FUTU$002SSDDFF in the database. When the cipher text needs to be decrypted, the prefix may tell the encryption machine the decryption method to be used to decrypt the cipher text. If only the cipher text XXYYZZ is transmitted to the other side and the other side is notified that the decryption method is padding decryption, then the decryption can succeed. If only the cipher text XXYYZZ is transmitted to the other side and the other side is notified that the decryption method is non-padding decryption, then the decryption will fail.

Optionally, the encryption scheme in the embodiments of the present disclosure may be any one of the four encryption schemes in the above Table 1.

Optionally, the data type in the embodiments of the present disclosure may be the data type corresponding to any one of the four encryption schemes in Table 1.

It can be understood that the step 401 may be generated by the first device, or set by a user, or specified by instructions transmitted by another device, which is not limited in the present disclosure.

It can be understood that, for the non-encryption scheme in Table 1, two involved sides can directly interact using plain texts without encryption. For the convenience of description, data types other than non-encryption data in Table 1 are described in the following embodiments, but the present disclosure is not limited thereto.

At step 402, a first encryption scheme corresponding to a first data type of first data is determined based on the mapping relation.

Specifically, when the first data is obtained by the first device, the first device may determine the first encryption scheme corresponding to a data type of the first data based on the mapping relation.

In an embodiment of the present disclosure, after the first data is obtained, first, the data type corresponding to the first data is determined, and then the encryption scheme corresponding to the data type is determined from the mapping relation based on the data type. Specifically, a process of determining the data type according to this embodiment may include: determining a text length corresponding to the first data, and determining whether the first data is first-type data based on a comparison result between the text length and a predetermined threshold, where the first-type data includes a text or a file having a length greater than the predetermined threshold; and matching a first target character type with characters in the first data, determining, based on a matching result, whether the first data includes a target field, and determining the first data as second-type data when the first data includes the target field, where the first target character type includes a name or a number, and the second-type data includes a field related to an index or a query.

At step 403, the first data is encrypted in accordance with the first encryption scheme to obtain a first cipher text.

In a possible implementation, the first encryption scheme is the long text encryption scheme, and specifically, at the step 403, the first device encrypts the first data using a first secret key to obtain the first cipher text. The first secret key is a secret key corresponding to the first data. In addition, the first device further encrypts the first secret key to obtain a second cipher text.

Specifically, for sensitive information of different users, the first device uses different secret keys. Or the first device uses different secret keys for different companies. That is, different secret keys are used for different companies or different users, such that an effect of isolation is achieved, thereby ensuring that a company can only obtain encrypted or decrypted data of its own, and a user cannot decrypt data of other people.

It can be understood that the first data may be sensitive data of the user. For example, the sensitive information is share-holding incentive information of an employee (i.e., option and stock information of the employee).

Optionally, the first device encrypting the first secret key may specifically be that the first device encrypts the first secret key using a second secret key to obtain the second cipher text.

Optionally, the second secret key is a secret key agreed upon in advance by the first device and the second device.

Specifically, before data processing, the first device and the second device agree on a same secret key in advance. In this way, the first device can encrypt the first secret key using the secret key agreed upon with the second device. That is, after the first device encrypts data using the agreed secret key, the second device can only decrypt the encrypted data using the agreed secret key.

It can be understood that the second device in the present disclosure may be a service end (KMS_servic).

Optionally, the first device encrypts the first secret key using a second secret key to obtain a second secret key, and the second secret key is a public key corresponding to a private key in the second device.

Specifically, a pair of public key and private key can be set between the first device and the second device. The public key and the private key are a secret key pair (that is, one private key and one public key) obtained through an algorithm. A key that is disclosed to the public is called the "public key", and a key that is kept to itself is called the "private key". The secrete key pair obtained through this algorithm can be guaranteed to be unique in the world. That is, after the first device encrypts the first secret key using the public key, the first secret key can only be decrypted using the private key.

In another possible implementation, the first encryption scheme is the random padding encryption scheme, and specifically, the step 403 may be that the first device encrypts the first data using the first secret key to obtain the first cipher text, and the first secret key is a random secret key.

In another possible implementation, the first encryption scheme is the non-random padding encryption scheme, and specifically, the step 403 may be that the first device encrypts the first data using the first secret key to obtain the first cipher text, and the first cipher text is a fixed secret key.

At step 404, a first data packet is generated based on the first cipher text and the first encryption scheme.

Optionally, step 404 may specifically be that the first device generates the first data packet by using an encryption identifier corresponding to the first encryption scheme as a prefix.

For example, as mentioned above, when the first encryption scheme is the padding encryption, since an encryption identifier corresponding to the padding encryption is FUTU$001, the first data packet generated for the first cipher text XXYYZZ and the padding encryption scheme is FUTU$001XXYYZZ; and when the first encryption scheme is the non-padding method, since an encryption identifier corresponding to the non-padding encryption is FUTU$002, the first data packet generated for the first cipher text SSDDFF and the non-padding encryption scheme is FUTU$002SSDDFF.

It can be understood that the encryption identifier may alternatively be in other forms, which is not limited in the present disclosure.

It should be noted that when the first encryption scheme is the long text encryption scheme, the encryption identifier corresponding to the long text encryption scheme is FUTU$TyThg4KnMMKH5G1n$, and the first data packet needs to be generated based on the first cipher text, the second cipher text, and the encryption identifier.

In a possible implementation, the cipher text and the encryption identifier may be spliced to generate a data packet.

Specifically, the encryption identifier and the first cipher text may be spliced in a manner that the encryption identifier is before the first cipher text. Or, when the first data packet is generated based on the encryption identifier, the first cipher text, and the second cipher text, splicing may be performed in a manner that the encryption identifier is before the second cipher text and the second cipher text is before the first cipher text. For example, as illustrated in FIG. 3, data_key is before the cipher text fields.

It can be understood that the first data packet may also be generated by other splicing methods, e.g., nesting, combination, etc.

Exemplarily, in an embodiment, in a process of nesting of the cipher text and the encryption identifier, to ensure the security of the cipher text and the encryption identifier, a corresponding insertion position may be calculated based on data attributes of the first data and the cipher text, and then the encryption identifier is inserted at a corresponding position in the cipher text based on the insertion position. For example, when the corresponding insertion position is calculated as n, the encryption identifier is inserted to a position n by starting from a 1-st character of the cipher text, and characters at and after the original position n in the cipher text are pushed backwards. Specifically, in this embodiment, the insertion position can be determined by the following formula:

$$n = size\_cip \bmod (\log 2size\_cip)$$

In the formula, size_cip represents a data volume of the cipher text, mod represents a remainder operation, and n represents the insertion position of the encryption identifier in the cipher text. The insertion position is determined by the above calculation method, so as to insert the encryption identifier into the cipher text based on the insertion position. Further, when encrypted data is to be decrypted, an insertion position can be calculated in the same method, then an encrypted cipher text is extracted, and then the encrypted cipher text is decrypted, and then the cipher text is decrypted based on the secrete key. With the above method, the security of the encryption scheme is improved, thereby further improving the security of the first data.

At step 405, the first device transmits the first data packet to a second device. Correspondingly, the second device receives the first data packet from the first device, and the first data packet includes the first cipher text and a prefix.

At step 406, the second device decrypts, in accordance with an encryption scheme corresponding to the prefix, the first cipher text to obtain the first data.

Optionally, when the encryption scheme is the long text encryption scheme, the second device decrypts the second cipher text using a third secret key to obtain the first secret key, and decrypts the first cipher text based on the first secret key to obtain the first data.

Optionally, the third secret key is a secret key corresponding to the second secret key.

In a possible implementation, the third secret key is a secret key agreed upon in advance by the first device and the second device.

In another possible implementation, the third secret key is the private key corresponding to the above public key.

At step 407, the second device performs data processing on the first data.

Specifically, the second device performing data processing on the first data may be that the second device performs a corresponding operation according to a first data instruction, or the second device forwards the first data to another device, and the present disclosure is not limited thereto.

Optionally, after step 407, the second device may encrypt second data obtained after the data processing on the first data and transmit the encrypted second data to the first device.

In the embodiments of the present disclosure, the first device obtains the mapping relation that includes the correspondence between the at least one data type and the at least one encryption scheme, determines the first encryption scheme corresponding to the data type of the first data based on the mapping relation, generates the first data packet based on the first encryption scheme, and transmits the first data packet to the second device. In this way, the first device uses different encryption schemes depending on different data types, such that the second device decrypts the cipher text based on the encryption identifier to obtain the first data. That is, according to the embodiments of the present disclosure, different encryption schemes are used for different data types, thereby improving data security without affecting normal use.

Figure 5:
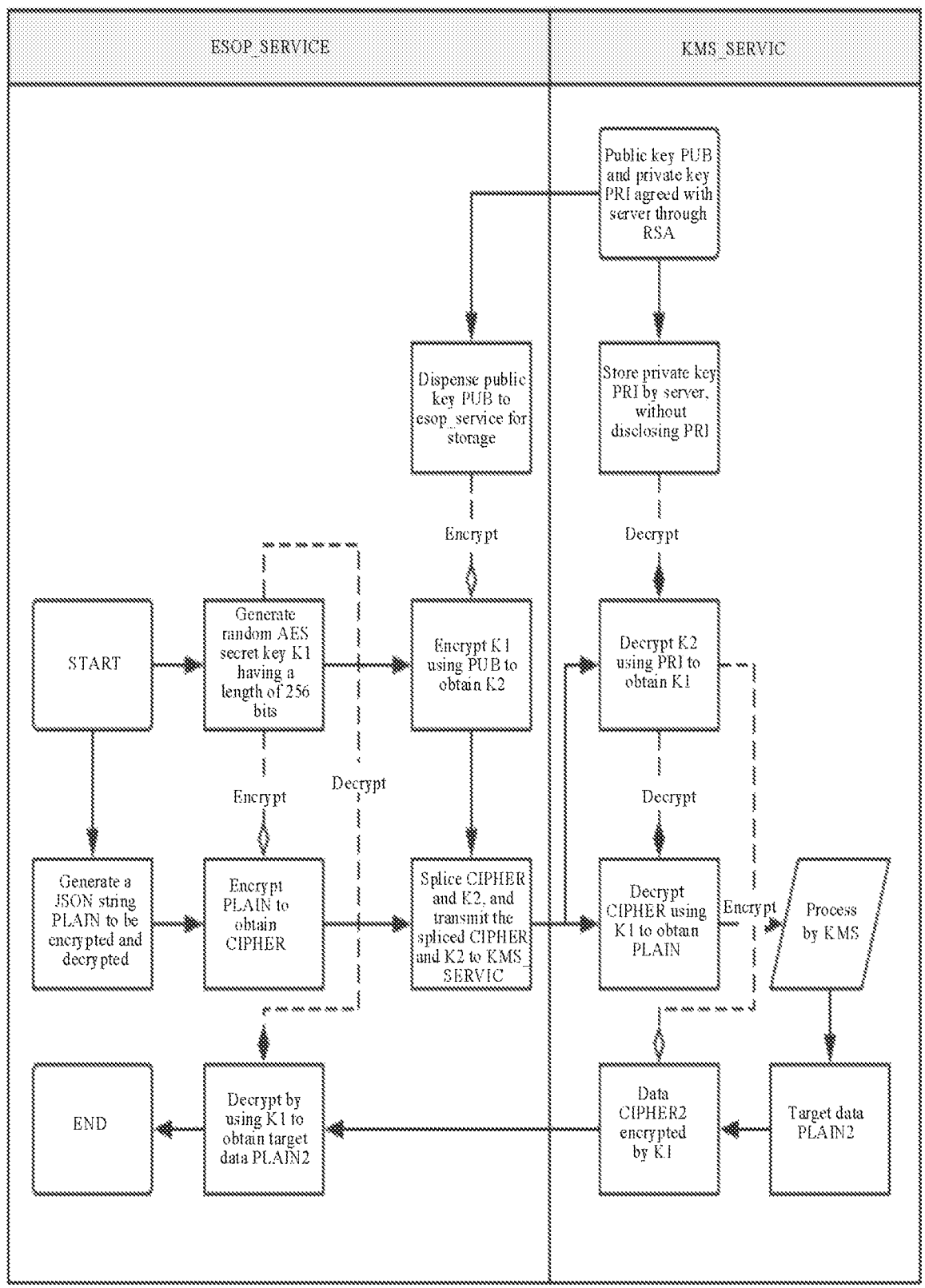
FIG. 5 illustrates a flowchart of a specific method for data processing according to an embodiment of the present disclosure.

FIG. 5 illustrates a flowchart of a specific method for data processing according to an embodiment of the present disclosure.

It can be understood that the following description takes the first device being the ESOP_service and the second device being the KMS_servic as an example, but the present disclosure is not limited to thereto.

When the encryption scheme is the long text encryption scheme, the ESOP_service and the KMS_servic agree upon in advance a public key PUB and a private key PRI that are paired by an RSA algorithm. The KMS_servic transmits the private key to the ESOP_service, but keeps the private key to itself and does not expose the private key to public.

At 501 the ESOP_service generates a random string having a length of 256 bits, the random string being used as a secrete key K1 for Advanced Encryption Standard (AES) encryption.

At 502, the ESOP_service constructs data to be encrypted, a specific structure of the data being a json string PLAIN.

At 503, the ESOP_service encrypts PLAIN using the secret key K1 to obtain a cipher text CIPHER.

In step 504, the ESOP_service encrypts the secret key K1 using the secret key PUB to obtain a cipher text K2.

It can be understood that the present disclosure does not limit a sequence of the step 503 and the step 504.

At 505, the ESOP_service splices CIPHER and K2, and transmits the spliced CIPHER and K2 to the KMS_servic.

At 506, the KMS_servic obtains the spliced CIPHER and K2.

At 507, the KMS_servic decrypts the cipher text K2 using the PRI corresponding to the PUB to obtain K1.

At 508, the KMS_servic decrypts CIPHER using K1 to obtain PLAIN.

At 509, the KMS_servic performs data processing on PLAIN to obtain PLAIN2.

At 510, the KMS_servic encrypts PLAIN2 using K1 to obtain CIPHER2, and feeds CIPHER2 back to the ESOP_service.

It can be understood that the KMS_servic can also continue encrypting K1. For example, KMS_servic uses the secret key agreed with the ESOP_service to encrypt K1.

At 511, the ESOP_service decrypts CIPHER2 using K1 to obtain PLAIN2.

It can be understood that if the KMS_servic encrypts K1, the ESOP_service can decrypt K1 first, and then encrypt PLAIN2 using K1.

The specific embodiments of the present disclosure are described in detail above with reference to the accompanying drawings. However, the present disclosure is not limited to specific details in the above embodiments. Many simple variants can be made to the technical solutions of the present disclosure within the scope of the technical concept of the present disclosure. These simple variants belong to the protection scope of the present disclosure. For example, the various specific technical features described in the above specific embodiments can be combined in any suitable manner without contradictions. In order to avoid unnecessary repetitions, various possible combinations will not be described separately in the present disclosure. For another example, different implementations of the present disclosure can also be combined arbitrarily, without departing from the concept of the present disclosure, and should also be regarded as the content disclosed in the present disclosure.

It should also be understood that in the various method embodiments of the present disclosure, numerical values of sequence numbers of the above processes do not mean an execution order and should not constitute any limitation to an implementation process of the embodiments of the present disclosure as the execution order of individual processes should be determined by their functions and internal logics. It should be understood that these sequence numbers can be interchanged with each other under appropriate circumstances, such that the described embodiments of the present disclosure can be implemented in a sequence other than those illustrated in the figures or described in the present disclosure.

The method embodiments of the present disclosure are described in detail above with reference to FIGS. 1 to 5, and apparatus embodiments of the present disclosure will be described in detail below in conjunction with FIGS. 6 to 9.

Figure 6:
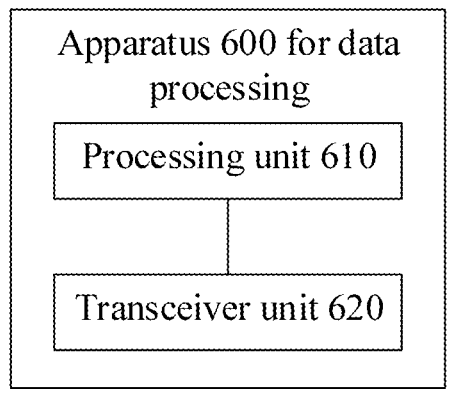
FIG. 6 is a schematic block diagram showing an apparatus for data processing according to an embodiment of the present disclosure.

FIG. 6 is a schematic block diagram showing an apparatus 600 for data processing according to an embodiment of the present disclosure. As illustrated in FIG. 6, the apparatus 600 for data processing may include a processing unit 610 and a transceiver unit 620.

The processing unit 610 is configured to obtain a mapping relation that includes a correspondence between at least one data type and at least one encryption scheme. The processing unit 610 is further configured to determine a first encryption scheme corresponding to a first data type of first data based on the mapping relation. The processing unit 610 is further configured to encrypt the first data in accordance with the first encryption scheme to obtain a first cipher text. The processing unit 610 is further configured to generate a first data packet based on the first cipher text and the first encryption scheme. The transceiver unit 620 is configured to transmit the first data packet to a second device in the equity incentive system.

Optionally, the first encryption scheme is a random padding encryption scheme, a non-random encryption scheme, or a long text encryption scheme.

Optionally, the first encryption scheme is the long text encryption scheme; and the processing unit 620 is specifically configured to: encrypt the first data using a first secret key to obtain the first cipher text, where the first secret key is a secret key corresponding to the first data; encrypt the first secret key to obtain a second cipher text; and generate the first data packet based on the first cipher text, the first encryption scheme, and the second cipher text.

Optionally, the first encryption scheme is the random padding encryption scheme, and the processing unit 620 is specifically configured to: encrypt the first data using a first secret key to obtain the first cipher text, where the first secret key is a random secret key; and generate the first data packet based on the first cipher text and the first encryption scheme.

Optionally, the first encryption scheme is the non-random padding encryption scheme, and the processing unit 620 is specifically configured to: encrypt the first data using the first secret key to obtain the first cipher text, where the first secret key is a fixed secret key; and generate the first data packet based on the first cipher text and the first encryption scheme.

Optionally, the processing unit 620 is specifically configured to encrypt the first secret key using a second secret key to obtain the second cipher text, where the second secret key is a secret key agreed between the first device and the second device.

Optionally, the processing unit 620 is specifically configured to encrypt the first secret key using a second secret key to obtain the second cipher text, where the second secret key is a public key corresponding to a private key in the second device.

Optionally, the processing unit 620 is further configured to splice the first cipher text and the second cipher text to obtain the first data packet.

Optionally, the processing unit 620 is further configured to generate the first data packet by using an encryption identifier corresponding to the first encryption scheme as a prefix.

It should be understood that the apparatus embodiments may correspond to the method embodiments, and reference may be made to the method embodiments for similar description of the apparatus embodiments. Details thereof will not be repeated here to avoid repetition. Specifically, in this embodiment, the apparatus 600 for data processing may correspond to a corresponding subject that performs the method 400 according to the embodiments of the present disclosure, and the above and other operations and/or functions of modules in the apparatus 600 for data processing are respectively configured to perform procedures in FIG. 4, or corresponding processes of the method in FIG. 4. Details thereof will be omitted here for simplicity.

The apparatus and system according to the embodiments of the present disclosure are described above from the perspective of functional modules in conjunction with the accompanying drawings. It should be understood that the functional modules can be implemented in a form of hardware, instructions in a form of software, or a combination of hardware and software modules. Specifically, procedures of the method embodiments in the embodiments of the present disclosure can be completed by hardware integrated logic circuits in a processor and/or instructions in the form of software. The procedures of the method that are disclosed in conjunction with the embodiments of the present disclosure can be directly embodied as being executed by a hardware decoding processor, or executed by a combination of hardware and software modules in the decoding processor. Optionally, the software module may be located in a mature storage medium in the field such as a random access memory, a flash memory, a Read-Only Memory (ROM), a Programmable ROM (PROM), an electrically erasable programmable memory, and a register. The storage medium is located in the memory, and the processor reads information in the memory, and completes the procedures in the above method embodiments in combination with hardware in the processor.

Figure 7:
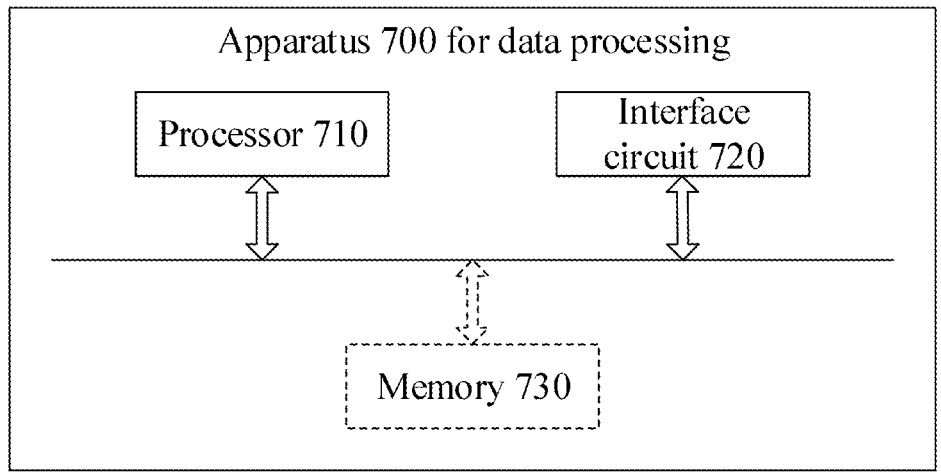
FIG. 7 is a schematic diagram showing a structure of an apparatus for data processing according to an embodiment of the present disclosure.

FIG. 7 is a schematic block diagram showing an apparatus 700 for data processing according to an embodiment of the present disclosure.

As illustrated in FIG. 7, the apparatus 700 for data processing may include a memory 710 and a processor 720.

The memory 710 is configured to store a computer program and transmit codes of the program to the processor 720. That is, the processor 720 can call the computer program from the memory 710 and execute the computer program to implement a communication method according to the embodiments of the present disclosure.

For example, the processor 720 may be configured to execute procedures in the method 400 or the method 500 based on instructions in the computer program.

In some embodiments of the present disclosure, the processor 720 may include but is not limited to a general-purpose processor, a Digital Signal Processor (DSP), an Application Specific Integrated Circuit (ASIC), a Field Programmable Gate Array (FPGA) or other programmable logic devices, a discrete gate or a transistor logic device, a discrete hardware component, etc.

In some embodiments of the present disclosure, the memory 710 includes but is not limited to a volatile memory and/or a non-volatile memory.

Here, the non-volatile memory can be an ROM, a PROM, an Erasable PROM (EPROM), an Electrically EPROM (EEPROM), or a flash memory. The volatile memory may be a Random Access Memory (RAM) configured as an external high-speed cache. By exemplary but not restrictive description, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a synch link DRAM (SLDRAM), and a Direct Rambus RAM (DR RAM).

In some embodiments of the present disclosure, the computer program may be divided into one or more modules that are stored in the memory 710 and executed by the processor 720, so as to implement an encoding method provided by the present disclosure. The one or more modules may be a series of instruction segments of the computer program that are capable of completing specific functions, and the instruction segments are used to describe an execution process of the computer program in the apparatus 900 for data processing.

Optionally, as illustrated in FIG. 7, the apparatus 700 for data processing may further include a transceiver 730 that may be connected to the processor 720 or the memory 710.

Here, the processor 720 may control the transceiver 730 to communicate with other devices, specifically, to transmit information or data to other devices, or receive information or data transmitted by other devices. The transceiver 730 may include a transmitter and a receiver. The transceiver 730 may further include one or more antennas.

It should be understood that various components in the apparatus 700 for data processing are connected via a bus system. Here, in addition to a data bus, the bus system further includes a power bus, a control bus, and a status signal bus.

Figure 8:
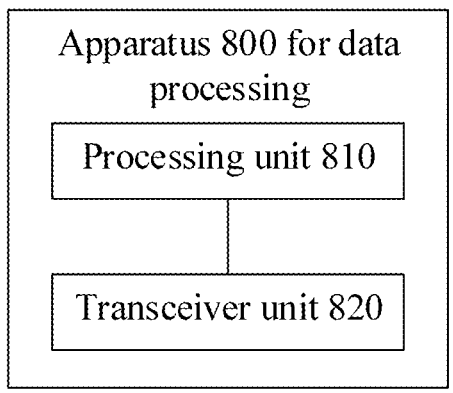
FIG. 8 is a schematic block diagram showing another apparatus for data processing according to an embodiment of the present disclosure.

FIG. 8 is a schematic block diagram showing an apparatus 800 for data processing according to an embodiment of the present disclosure. As illustrated in FIG. 8, the apparatus 800 for data processing may include a processing unit 810 and a transceiver unit 820.

The transceiver unit 820 is configured to receive a first data packet transmitted by a first device in the equity incentive system, where the first data packet includes a first cipher text and a prefix.

The processing unit 810 is configured to decrypt, in accordance with an encryption scheme corresponding to the prefix, the first cipher text to obtain first data, where the encryption scheme is a random padding encryption scheme, a non-random encryption scheme, or a long text encryption scheme.

The processing unit 810 is further configured to perform data processing on the first data.

Optionally, the processing unit 810 is further configured to decrypt the second cipher text using a third secret key to obtain the first secret key, where the third secret key is a secret key agreed between the second device and the first device.

Optionally, the processing unit 810 is further configured to decrypt the second cipher text using a third secret key to obtain the first secret key, where the third secret key is a private key corresponding to a public key in the first device.

Optionally, the first data packet is obtained by splicing the first cipher text and the second cipher text.

It should be understood that the apparatus embodiments may correspond to the method embodiments, and reference may be made to the method embodiments for similar description of the apparatus embodiments. Details thereof will not be repeated here to avoid repetition. Specifically, in this embodiment, the apparatus 800 for data processing may correspond to a corresponding subject that performs the method 400 according to the embodiments of the present disclosure, and the above and other operations and/or functions of modules in the apparatus 800 for data processing are respectively configured to perform procedures in FIG. 4, or corresponding processes of the method in FIG. 4. Details thereof will be omitted here for simplicity.

The apparatus and system according to the embodiments of the present disclosure are described above from the perspective of functional modules in conjunction with the accompanying drawings. It should be understood that the functional modules can be implemented in a form of hardware, instructions in a form of software, or a combination of hardware and software modules. Specifically, procedures of the method embodiments in the embodiments of the present disclosure can be completed by hardware integrated logic circuits in a processor and/or instructions in the form of software. The procedures of the method that are disclosed in combination with the embodiments of the present disclosure can be directly embodied as being executed by a hardware decoding processor, or executed by a combination of hardware and software modules in the decoding processor. Optionally, the software module may be located in a mature storage medium in the field such as a random access memory, a flash memory, a Read-Only Memory (ROM), a Programmable ROM (PROM), an electrically erasable programmable memory, and a register. The storage medium is located in the memory, and the processor reads information from the memory, and completes the procedures in the above method embodiments in combination with hardware in the processor.

Figure 9:
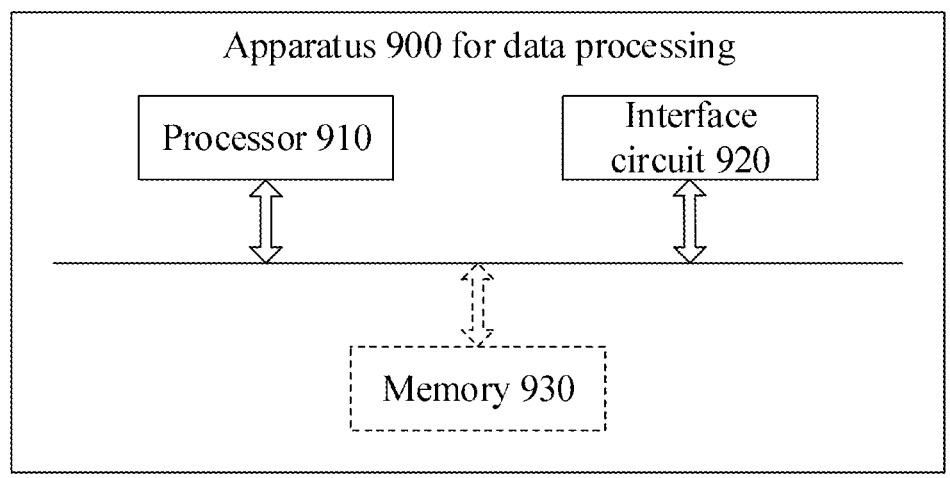
FIG. 9 is a schematic diagram showing a structure of another apparatus for data processing according to an embodiment of the present disclosure.

FIG. 9 is a schematic block diagram showing an apparatus 900 for data processing according to an embodiment of the present disclosure.

As illustrated in FIG. 9, the apparatus 900 for data processing may include a memory 910 and a processor 920.

The memory 910 has a computer program stored thereon and is configured to transmit codes of the program to the processor 920. That is, the processor 920 can call the computer program from the memory 910 and execute the computer program to implement a communication method according to the embodiments of the present disclosure.

For example, the processor 920 may be configured to execute procedures in the method 400 or the method 500 according to instructions in the computer program.

In some embodiments of the present disclosure, the processor 920 may include but is not limited to a general-purpose processor, a DSP, an ASIC, an FPGA or other programmable logic devices, a discrete gate or a transistor logic device, a discrete hardware component, etc.

In some embodiments of the present disclosure, the memory 910 includes but is not limited to a volatile memory and/or a non-volatile memory.

Here, the non-volatile memory can be an ROM, a PROM, an EPROM, an EEPROM, or a flash memory. The volatile memory may be an RAM configured as an external cache. By exemplary but not restrictive description, many forms of RAMs are available, such as an SRAM, a DRAM, an SDRAM, a DDR SDRAM, an ESDRAM, an SLDRAM, and a DR RAM.

In some embodiments of the present disclosure, the computer program may be divided into one or more modules that are stored in the memory 910 and executed by the processor 920, so as to implement an encoding method provided by the present disclosure. The one or more modules may be a series of instruction segments of the computer program that are capable of completing specific functions, and the instruction segments are used to describe an execution process of the computer program in the apparatus 900 for data processing.

Optionally, as illustrated in FIG. 9, the apparatus 900 for data processing may further include a transceiver 930 that may be connected to the processor 920 or the memory 910.

Here, the processor 920 may control the transceiver 930 to communicate with other devices, specifically, to transmit information or data to other devices, or receive information or data transmitted by other devices. The transceiver 930 may include a transmitter and a receiver. The transceiver 930 may further include one or more antennas.

It should be understood that various components in the apparatus 900 for data processing are connected via a bus system. Here, in addition to a data bus, the bus system also includes a power bus, a control bus, and a status signal bus.

According to an aspect of the present disclosure, an apparatus for data processing is provided. The apparatus includes a processor and a memory. The memory has a computer program stored thereon, and the processor is configured to call and execute the computer program stored in the memory to cause an encoder to perform the method according to the above method embodiments.

According to another aspect of the present disclosure, a computer storage medium is provided. The computer storage medium has a computer program stored thereon. The computer program, when executed by a computer, causes the computer to perform the method according to the above method embodiments. In other words, the embodiments of the present disclosure further provide a computer program product including instructions. The instructions, when executed by a computer, cause the computer to perform the method according to the above method embodiments.

According to yet another aspect of the present disclosure, a computer program product or a computer program is provided. The computer program product or the computer program includes computer instructions that are stored in a computer-readable storage medium. A processor of a computer device reads the computer instructions from a computer-readable storage medium, and executes the computer instructions such that the computer device performs the method according to the above method embodiments.

That is, when implemented by software, implementation can be made in the form of a computer program product completely or in part. The computer program product includes one or more computer instructions. The computer program instructions, when loaded and executed on a computer, produce all or a part of the processes or functions described in the embodiments of the present disclosure. The computer may be a general purpose computer, an application specific computer, a computer network, or any other programmable device. The computer instructions may be stored in a computer-readable storage medium or transmitted from one computer-readable storage medium to another computer-readable storage medium. For example, the computer instructions may be transmitted from one website, computer, server, or data center to another website, computer, server, or data center via a wired manner (such as coaxial cable, optical fiber, Digital Subscriber Line (DSL)) or a wireless manner (such as infrared, wireless, microwave, etc.). The computer-readable storage medium may be any usable medium that can be accessed by a computer or a data storage device such as a server or a data center integrated with one or more usable medium. The usable medium may be a magnetic medium (for example, a floppy disk, a hard disk, a magnetic tape), an optical medium (for example, a Digital Video Disc (DVD)), or a semiconductor medium (for example, a Solid State Disk (SSD)), etc.

It should be understood that in the embodiments of the present disclosure, "B corresponding to A" means that B is associated with A. In an implementation, B can be determined based on A. However, it should also be understood that determining B based on A does not mean that B is determined only based on A, instead, B can also be determined based on A and/or other information.

In the description of the present disclosure, unless otherwise specified, "at least one" refers to one or more, and "a plurality of" refers to two or more than two. In addition, "and/or" describes an association relationship between correlated objects, including three relationships. For example, "A and/or B" can mean A only, B only, or both A and B. Here, A and B can be singular or plural. The symbol "/" generally indicates an "or" relationship between the correlated objects preceding and succeeding the symbol. "at least one of the following items" or similar expressions refer to any combination of these items, including a single item or any combination of a plurality of items. For example, at least one of a, b, or c can represent a, b, c, a and b, a and c, b and c, or a, b, and c, where a, b, and c each can be singular or plural.

It should also be understood that expressions such as first and second in the embodiments of the present disclosure are only for illustrating and distinguishing the described objects, rather than to describe a specific sequence or represent a specific limitation on a number of devices in the embodiments of the present disclosure, nor do they constitute any limitation on the embodiments of the present disclosure.

It should also be understood that specific features, structures, or characteristics related to the embodiments of the present disclosure are included in at least one embodiment of the present disclosure. In addition, these specific features, structures, or characteristics can be combined with one or more embodiments in any suitable manner.

In addition, terms "include", "have", and any variations thereof are intended to cover non-exclusive inclusions. For example, a process, method, system, product, or server that includes a series of steps or units is not necessarily limited to those clearly listed steps or units, but may also include other steps or units that are not clearly listed or are inherent to the process, method, product, or device.

It can be appreciated by those skilled in the art that the modules and the steps of the algorithm of examples described in combination with the embodiments disclosed herein may be implemented in electronic hardware or a combination of computer software and electronic hardware, depending on specific applications and design constraint conditions of technical solutions. For each specific application, professionals and technicians can use different methods to implement the described functions, but such implementation should not be considered as going beyond the scope of the present disclosure.

In several embodiments provided by the present disclosure, it is to be understood that, the devices, apparatuses and methods disclosed can be implemented in other ways. For example, the apparatus embodiments described above are merely exemplary. For example, the modules are merely divided based on logic functions. In practical implementation, the modules can be divided in other manners. For example, multiple modules or components can be combined or integrated into another system, or some features can be omitted or not executed. In addition, mutual coupling or direct coupling or communication connection described or discussed can be implemented as indirect coupling or communication connection via some interfaces, apparatuses or modules, and may be electrical, mechanical or in other forms.

The modules illustrated as separate components may be or not be separated physically, and components shown as modules may be or not be physical modules, i.e., may be located at one position, or distributed onto multiple network units. It is possible to select some or all of the modules according to actual needs, for achieving the objective of embodiments of the present disclosure. For example, respective functional modules in respective embodiments of the present disclosure can be integrated into one processing module, or can be present as separate physical entities. It is also possible to integrate two or more modules into one module.

The above description merely illustrates specific implementations of the present disclosure, and the scope of the present disclosure is not limited thereto. Any change or replacement within the technical scope disclosed by the

What is claimed is:

1. A method for data processing in an equity incentive system, applied in a first device in the equity incentive system, the method comprising:
    obtaining a mapping relation that comprises a correspondence between at least one data type and at least one encryption scheme, wherein the at least one data type is determined based on at least one of a text length of share-holding incentive information of an employee or fields of the share-holding incentive information related to an index and a query;
    determining, based on the mapping relation, a first encryption scheme corresponding to a first data type of first data comprising the share-holding incentive information;
    encrypting the first data in accordance with the first encryption scheme to obtain a first cipher text;
    generating a first data packet based on the first cipher text and the first encryption scheme; and
    transmitting the first data packet to a second device in the equity incentive system,
    wherein the first encryption scheme is a random padding encryption scheme, a non-random encryption scheme, or a long text encryption scheme,
    wherein a data type corresponding to the random padding encryption scheme is a field, which is not involved in the query, of the share-holding incentive information; a data type corresponding to the non-random encryption scheme is a field of the share-holding incentive information related to the index or the query; and a data type corresponding to the long text encryption scheme is a text or file, which has a length greater than a predetermined threshold, of the share-holding incentive information.

2. The method according to claim 1, wherein
    the first encryption scheme is the long text encryption scheme,
    said encrypting the first data in accordance with the first encryption scheme to obtain the first cipher text comprises:
    encrypting the first data using a first secret key to obtain the first cipher text, wherein the first secret key is a secret key corresponding to the first data; and
    encrypting the first secret key to obtain a second cipher text; and
    said generating the first data packet based on the first cipher text and the first encryption scheme comprises:
    generating the first data packet based on the first cipher text, the first encryption scheme, and the second cipher text.

3. The method according to claim 1, wherein
    the first encryption scheme is the random padding encryption scheme,
    said encrypting the first data in accordance with the first encryption scheme to obtain the first cipher text comprises:
    encrypting the first data using a first secret key to obtain the first cipher text, wherein the first secret key is a random secret key; and
    said generating the first data packet based on the first cipher text and the first encryption scheme comprises:
    generating the first data packet based on the first cipher text and the first encryption scheme.

4. The method according to claim 1, wherein
    the first encryption scheme is the non-random padding encryption scheme;
    said encrypting the first data in accordance with the first encryption scheme to obtain the first cipher text comprises:
    encrypting the first data using a first secret key to obtain the first cipher text, wherein the first secret key is a fixed secret key; and
    said generating the first data packet based on the first cipher text and the first encryption scheme comprises:
    generating the first data packet based on the first cipher text and the first encryption scheme.

5. The method according to claim 2, wherein said encrypting the first secret key to obtain the second cipher text comprises:
    encrypting the first secret key using a second secret key to obtain the second cipher text, wherein the second secret key is a secret key agreed between the first device and the second device.

6. The method according to claim 2, wherein said encrypting the first secret key to obtain the second cipher text comprises:
    encrypting the first secret key using a second secret key to obtain the second cipher text, wherein the second secret key is a public key corresponding to a private key in the second device.

7. The method according to claim 2, further comprising, prior to transmitting, by the first device, the first data packet to the second device:
    splicing, by the first device, the first cipher text and the second cipher text to obtain the first data packet.

8. The method according to claim 1, wherein said generating the first data packet based on the first cipher text and the first encryption scheme comprises:
    generating the first data packet by using an encryption identifier corresponding to the first encryption scheme as a prefix.

9. An apparatus for data processing, comprising:
    a memory having instructions stored thereon; and
    a processor,
    wherein the processor, when executing the instructions, causes the apparatus to perform the method according to claim 1.

10. The apparatus according to claim 9, wherein the first encryption scheme is the long text encryption scheme,
    said encrypting the first data in accordance with the first encryption scheme to obtain the first cipher text comprises:
    encrypting the first data using a first secret key to obtain the first cipher text, wherein the first secret key is a secret key corresponding to the first data; and
    encrypting the first secret key to obtain a second cipher text; and
    said generating the first data packet based on the first cipher text and the first encryption scheme comprises:
    generating the first data packet based on the first cipher text, the first encryption scheme, and the second cipher text.

11. The apparatus according to claim 9, wherein
    the first encryption scheme is the random padding encryption scheme,
    said encrypting the first data in accordance with the first encryption scheme to obtain the first cipher text comprises:

encrypting the first data using a first secret key to obtain the first cipher text, wherein the first secret key is a random secret key; and said generating the first data packet based on the first cipher text and the first encryption scheme comprises:

generating the first data packet based on the first cipher text and the first encryption scheme.

12. The apparatus according to claim 9, wherein the first encryption scheme is the non-random padding encryption scheme;

said encrypting the first data in accordance with the first encryption scheme to obtain the first cipher text comprises:

encrypting the first data using a first secret key to obtain the first cipher text, wherein the first secret key is a fixed secret key; and said generating the first data packet based on the first cipher text and the first encryption scheme comprises:

generating the first data packet based on the first cipher text and the first encryption scheme.

13. A non-transitory computer-readable storage medium, having a computer program or instruction stored thereon, wherein the computer program or instruction, when executed, performs the method according to claim 1.

14. A non-transitory computer program product, comprising computer program codes, wherein the computer program codes, when executed by a communication device, cause the communication device to perform the method according to claim 1.

* * * * *